(12) United States Patent
Shiau et al.

(10) Patent No.: US 7,239,430 B2
(45) Date of Patent: Jul. 3, 2007

(54) BINARY HALFTONE DETECTION

(75) Inventors: Jeng-nan Shiau, Webster, NY (US); Ying-wei Lin, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 977 days.

(21) Appl. No.: 10/318,614

(22) Filed: Dec. 12, 2002

(65) Prior Publication Data

US 2004/0114185 A1 Jun. 17, 2004

(51) Int. Cl.
*H04N 1/405* (2006.01)
(52) U.S. Cl. ..................................... 358/3.08; 358/2.99
(58) Field of Classification Search .................. 358/1.9, 358/3.2, 3.06–3.09, 2.99, 534, 536
See application file for complete search history.

(56) References Cited

U.S. PATENT DOCUMENTS

| 4,194,221 A | 3/1980 | Stoffel ........................ 358/283 |
| 4,811,115 A | 3/1989 | Lin et al. .................... 358/283 |
| 5,327,262 A | 7/1994 | Williams ................... 358/462 |
| 5,434,953 A | 7/1995 | Bloomberg ................. 395/139 |
| 5,765,029 A | 6/1998 | Schweid et al. .............. 395/61 |
| 5,778,156 A | 7/1998 | Schweid et al. .............. 395/61 |
| 5,850,474 A | 12/1998 | Fan et al. .................... 382/173 |
| 5,852,678 A | 12/1998 | Shiau et al. ................ 382/176 |
| 6,181,829 B1 * | 1/2001 | Clark et al. ................. 382/273 |
| 6,185,328 B1 * | 2/2001 | Shiau ......................... 382/173 |
| 6,229,923 B1 * | 5/2001 | Williams et al. ............ 382/224 |
| 6,240,205 B1 | 5/2001 | Fan et al. .................... 382/173 |
| 6,347,153 B1 * | 2/2002 | Triplett et al. .............. 382/224 |
| 6,549,658 B1 * | 4/2003 | Schweid et al. ............ 382/173 |
| 6,983,076 B2 * | 1/2006 | Curry et al. ................ 382/260 |

FOREIGN PATENT DOCUMENTS

EP 521662 A1 * 1/1993

* cited by examiner

*Primary Examiner*—Thomas D. Lee
*Assistant Examiner*—Stephen Brinich

(57) ABSTRACT

A method to detect frequency and angle of a binary halftone pattern. The method employs an exclusive-or operation which is applied locally to a region of a binary bit map and its spatially shifted version. The resulting bits from the exclusive-or operation are summed over the region. The exclusive-or operation is repeated for a range of shift values. In a halftone region, the shift at which the minimum sum occurs reflects the angle and the frequency of the halftone.

19 Claims, 6 Drawing Sheets

| ky/kx | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | 0 | 48 | 80 | 92 | 92 | 92 | 78 | 46 | *6 | 50 | 82 | 90 | 90 | 90 |
| 1 | 41 | 65 | 89 | 91 | 91 | 91 | 79 | 47 | 39 | 67 | 88 | 90 | 90 | 90 |
| 2 | 75 | 89 | 91 | 89 | 75 | 75 | 89 | 73 | 73 | 87 | 90 | 88 | 74 | 74 |
| 3 | 91 | 91 | 89 | 63 | 43 | 51 | 85 | 89 | 89 | 89 | 88 | 62 | 40 | 52 |
| 4 | 91 | 91 | 79 | 47 | *9 | 49 | 83 | 89 | 89 | 89 | 78 | 46 | 8 | |
| 5 | 90 | 90 | 80 | 48 | 40 | 66 | 87 | 89 | 89 | 72 | 80 | 48 | 42 | |
| 6 | 74 | 74 | 90 | 74 | 74 | 88 | 88 | 86 | 72 | 52 | 89 | 73 | | |
| *4 | 52 | 84 | 90 | 90 | 90 | 86 | 60 | 40 | 52 | 83 | 89 | | | |
| 7 | 41 | 50 | 82 | 90 | 90 | 90 | 76 | 44 | *4 | 52 | 83 | | | |
| 8 | 75 | 65 | 88 | 88 | 90 | 74 | 78 | 46 | 40 | 68 | | | | |
| 9 | 91 | 89 | 90 | 62 | 42 | 52 | 88 | 72 | 72 | | | | | |
| 10 | 91 | 91 | 88 | 46 | 8 | 50 | 84 | 88 | | | | | | |
| 11 | 89 | | | | | | | | | | | | | |

FIG. 3

| ky/kx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0 | 0 | 0 | 0 | 0 | 0 | 4 | 231 | 0 | 0 | 0 | 0 |
| 1 | 0 | 0 | 0 | 0 | 0 | 0 | 0 | 0 | 0 | 1 | 0 | 0 | 0 |
| 2 | 0 | 0 | 0 | 0 | 0 | 0 | 0 | 0 | 0 | 0 | 0 | 0 | 0 |
| 3 | 0 | 0 | 0 | 9 | 39 | 2 | 0 | 0 | 0 | 0 | 0 | 0 | 0 |
| 4 | 0 | 0 | 0 | 38 | 3187 | 1 | 0 | 0 | 0 | 0 | 0 | 0 | 0 |
| 5 | 0 | 0 | 0 | 0 | 1 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 7 | 3 | 1 | 0 | 0 | 0 | 0 | 0 | 0 | 0 | 0 | 0 | 0 | 0 |
| 8 | 197 | 1 | 0 | 0 | 0 | 0 | 0 | 0 | 42 | 0 | 0 | 0 | 0 |
| 9 | 0 | 0 | 0 | 0 | 0 | 0 | 0 | 0 | 1 | 0 | 0 | 0 | 0 |
| 10 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 |
| 12 | 0 | 0 | 0 | 1 | 0 | 0 | 0 | 0 | 0 | 0 | 0 | 0 | 0 |

FIG. 6

BINARY HALFTONE DETECTION

FIELD OF THE INVENTION

The present invention relates generally to a system and method for processing image data. More particularly, the teachings herein are directed to the detection of halftone frequency of binary images prior to processing.

BACKGROUND AND SUMMARY

A common goal in the development of imaging systems is the improvement in image quality. A system can be readily designed to process image data in the appropriate manner given the capabilities of the rendering system to provide high quality output if characteristics of the image data are known. However, when processing image data generated at or targeted for a different system, the characteristics of the image data are typically not known. Thus, tailoring the image processing to obtain acceptable image quality can be difficult due to the divergent processing needs required by different image types.

Consider, for example, the reproduction of images from scanned image data as might be obtained through line by line scanning of a document image. In reproducing such images, it is desirable to know the image type which may be encountered in the scanned image data as text and non-text regions are often processed differently in converting an image targeted for one printer originally to another printer. Furthermore, when processing the non-text regions, it is desirable to know the halftone frequency so that the appropriate processing can be applied. One common approach to image conversion in not-text regions is to de-screen the image and re-screen it with an optimal screen for target printer. When the halftone frequency is known, the system can avoid re-screening a low frequency halftone and eliminate the resulting moiré. In another approach, the binary dot profile is modified according to tone reproductions. Here again, knowing the original halftone frequency is required to select an appropriate correction.

To address this situation, digital reproduction devices often use automatic image segmentation techniques. An auto-segmentation operation may use any of a number of classification functions (e.g., auto-correlation, frequency analysis, pattern or template matching, peak/valley detection, histograms, etc.) to analyze image data and classify image pixels as one of several possible image classes (image types). Auto-segmentation processes typically generate a pixel classification signal, known as a segmentation tag, that identifies the pixel as a particular image class.

The use of an auto-correlation function for detection of halftones was proposed by Stoffel in U.S. Pat. No. 4,194,221. In particular, if P(x) represents the gray value of the pixel at location x, the auto-correlation as function of the image shift k computed over N number of pixels is defined as follows:

$$A(x) = \sum_{x=1}^{N} P(x) \times P(x+k) \quad (1)$$

For images that are periodic, the computed auto-correlation would have maximum peaks at shifts corresponding to the period of the periodic variations and its multiples. As a halftone image is usually periodic, the auto-correlation is well suited for detecting its frequency.

However, the use of an auto-correlation function as taught by U.S. Pat. No. 4,194,221 required multiplication which was relatively difficult and expensive to implement in hardware. In addition, this system and method required, as a practical matter, a reduction in the amount of data handled by thresholding the received image data. Such thresholding was difficult to implement and often resulted in undesirable loss of image data.

To improve the process by addressing some of the perceived limitations of the auto-correlation system and method taught by Stoffel in U.S. Pat. No. 4,194,221, a simplified version of the auto-correlation function was taught by Lin and Calarco in U.S. Pat. No. 4,811,115. This simplified version of the auto-correlation function uses logical functions and additions, rather than multiplication to approximate the auto-correlation function. This simplified auto-correlation function could be easier to implement in hardware than the multiplicative function proposed by Stoffel and taught in U.S. Pat. No. 4,194,221. In particular, the simplified version of the function as proposed is given by:

$$A'(x) = \sum_{x=1}^{N} |P(x) - P(x+k)| \quad (2)$$

When the function of Eqn. (2) is applied to a stream of image data, the minimums in the resulting auto-correlated function can be detected to determine whether halftone data is present. That is, rather than the maximum, the minimum occurs at the shift corresponding to the period of image variation.

While the above techniques provide means for identifying halftones, there is always desired a method or system which provides an improvement on existing systems or methods. Such improvement may come in the form of improved performance, efficiency, and/or cost, and may include, but is not limited to one or more of reduced hardware or software complexity, reduced system resource requirements (e.g., processing and/or memory), increased speed, increased accuracy, etc. Thus, there is desired a method or system that can accurately detect halftone frequency and screen angle in a manner which may be more efficient than the existing systems and methods.

In accordance with one or more aspects of the teachings herein, there is provided an efficient method to detect frequency and angle of a binary halftone pattern which can be effectively implemented in hardware and/or software. The method employs an exclusive-or operation which can be applied locally to a small region of a binary bit map and its spatially shifted version. The resulting bits are summed over the region. The exclusive-or operation can be repeated for a range of horizontal and vertical shift values. In a halftone region, the shift at which the minimum sum occurs reflects the angle and the frequency of the halftone.

In accordance with one or more aspects of the teachings herein, there is provided a method of processing image data to determine the frequency of a binary halftone, comprising: receiving a block of pixels; applying an exclusive-or function to the block of pixels, the exclusive-or function given by:

$$A'(kx, ky) = \sum_{x=1,y=1}^{Nx,Ny} P(x, y) \wedge P(x+kx, y+ky)$$

where P(x,y) represents a pixel intensity function at pixel position x,y in the image data, x and y define a selected pixel position, and kx and ky are selected shifts in pixel position applied to the pixel intensity function and Nx and Ny define the pixel range over which the function is evaluated; identifying a local minimum in A'(kx,ky); and determining a halftone frequency f from the identified local minimum.

In accordance with further aspects of the teachings herein there is provided a method of processing image data to determine the frequency of a halftone. The method includes receiving the image data; identifying a block of pixels within a non-text region; applying an exclusive-or function to the block of pixels, wherein the exclusive-or function given by:

$$A'(kx, ky) = \sum_{x=1,y=1}^{Nx,Ny} P(x, y) \wedge P(x+kx, y+ky);$$

identifying a local minimum in A'(kx,ky); repeating the steps of identifying a block of pixels within a non-text region, applying an exclusive-or function, and identifying a local minimum for a plurality of pixel blocks within the non-text region; collecting statistics on the identified local minimums for the plurality of pixel blocks; and determining a halftone frequency f from the collected statistics.

BRIEF DESCRIPTION OF THE DRAWINGS

The teachings and embodiments disclosed herein will be described with reference to the accompanying drawings which are provided for purposes of illustrating various aspects of the teachings and embodiments and are not to be construed as limiting the same, and wherein:

FIG. 3 shows the results of the exclusive-or auto-correlation function applied to the bit map of FIG. 2;

FIG. 6 illustrates a two-dimensional histogram of block counts in kx and ky.

DESCRIPTION

The present description is directed in particular to elements forming part of, or cooperating more directly with an apparatus for or method of processing image data in accordance with teachings and embodiments disclosed herein. It is to be understood that elements not specifically shown or described may take various forms well known to those skilled in the art.

Figure 1:
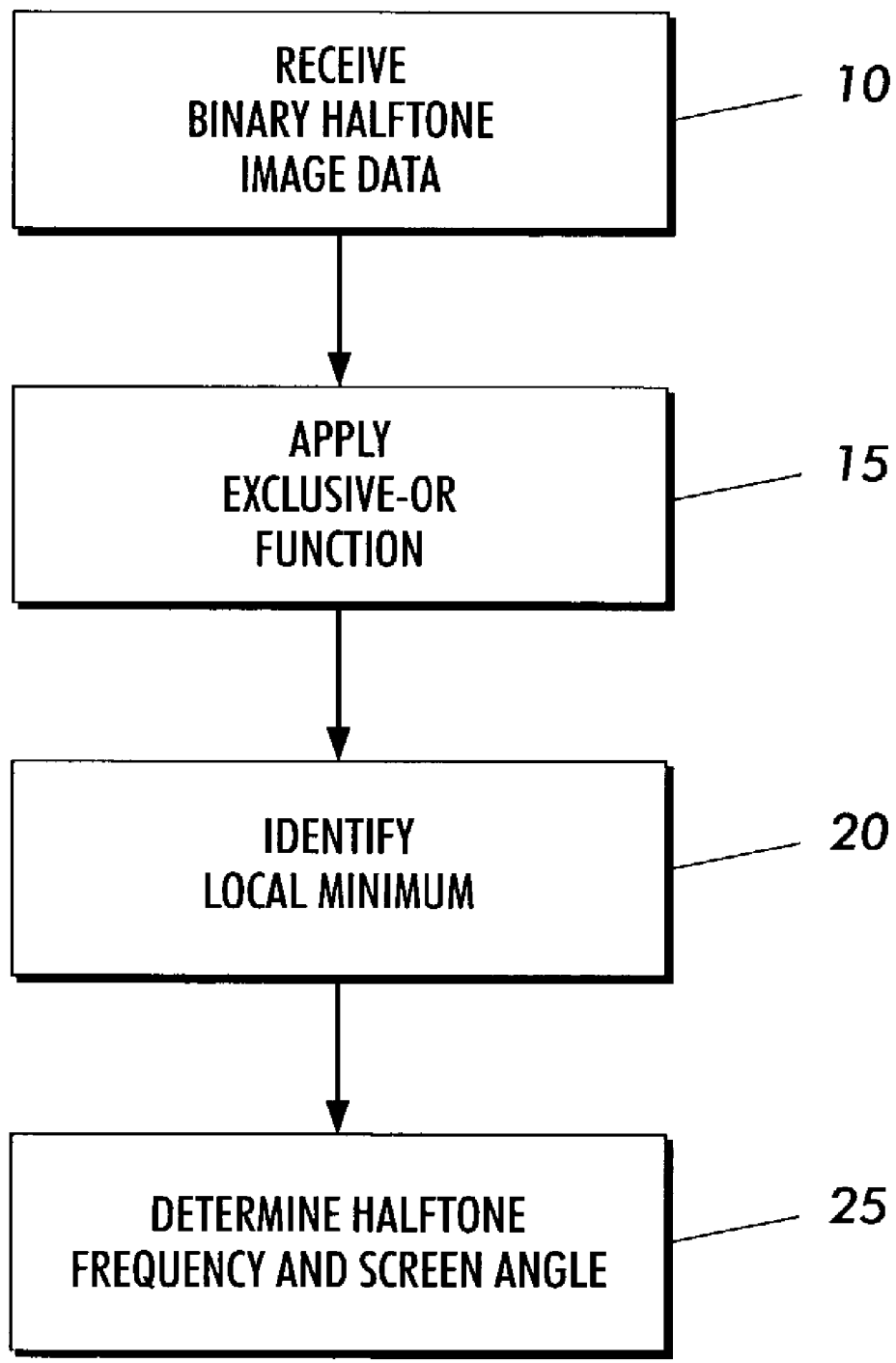
FIG. 1 illustrates an embodiment of a method for binary halftone frequency detection.

Turning to FIG. 1, there is shown an embodiment of a method for binary halftone frequency detection. The method operates on binary halftone image data received (step 10) from an image source such as a raster input scanner or similar scanning device, a computer workstation, a data storage device, a network or any other image input device.

An exclusive-or function is applied to a set of pixels within the received binary image data (step 15). For binary images, it was recognized that an exclusive-or function could be applied to sets of pixels to detect halftone frequency. The exclusive-or auto-correlation operation is given by:

$$A'(x) = \sum_{x=1}^{N} P(x) \wedge P(x+k) \quad (3)$$

It should be appreciated that exclusive-or operations can be performed over 32 bits in one instruction in most central processing units of modern computers. Furthermore, the summation over the N pixels could be performed using pre-computed look up tables; thereby the computation can be sped up significantly for binary images. Additionally, the exclusive-or auto-correlation can be computed in two dimension as follows:

$$A'(kx, ky) = \sum_{x=1,y=1}^{Nx,Ny} P(x, y) \wedge P(x+kx, y+ky) \quad (4)$$

where P(x,y) represents a pixel intensity function, at any selected pixel position in the image data, x and y define a selected pixel position, and kx and ky are selected shifts in pixel position applied to the pixel intensity function and Nx and Ny define the pixel range over which the function is evaluated.

The shifts kx and ky at which the minimum of A' occurs give the horizontal and vertical projections of the period of the halftone, from which the halftone frequency and screen angle can be deduced. In other words, the exclusive-or function is applied locally to a small rectangular region of binary bit map and its spatially shifted version. The resulting bits from the exclusive-or operation are summed over the rectangular region. This exclusive-or operation is repeated for a range of horizontal and vertical shift values. In a halftone region, the shift at which the minimum of the sum occurs reflects the angle and the frequency of the halftone.

Figure 2:
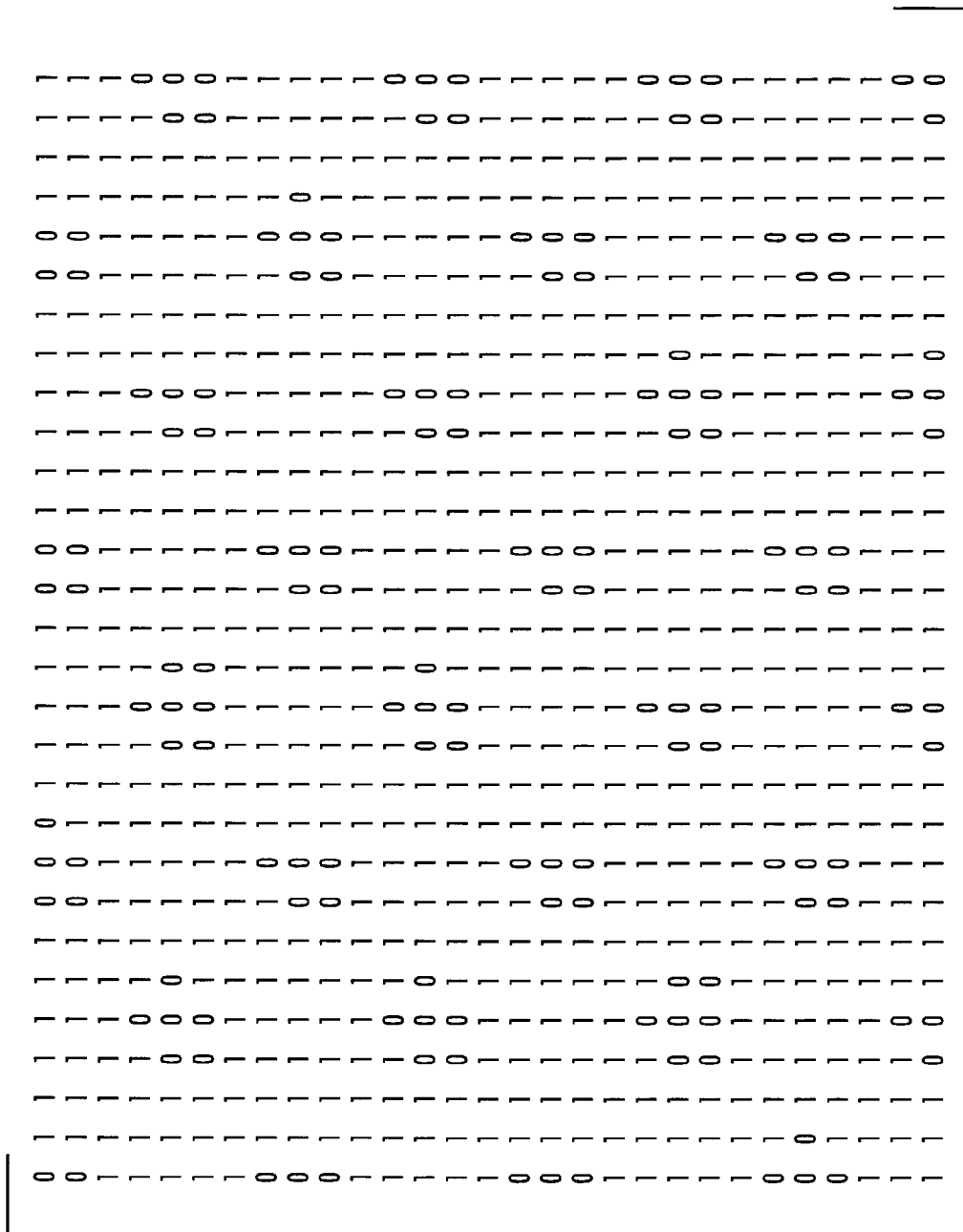
FIG. 2 illustrates a bit map of a portion of a halftone pattern within a binary image.

The operation of the exclusive-or auto-correlation function can be illustrated, by way of example, with additional reference to FIGS. 2 and 3. FIG. 2 illustrates a bit map of a portion of a halftone pattern within a binary image. More specifically, there is shown the bit map in a portion of a 106 line per inch (lpi), 45 degree screened image at 600 spots per inch (spi) wherein the ones and zeros represent white and black pixels, respectively. FIG. 3 shows the result of applying the exclusive-or auto-correlation function to the bit map of FIG. 2. More specifically, FIG. 3 shows the results of the computed exclusive-or auto-correlation function as defined in Eqn. (4) over a range of kx and ky in a circular quadrant.

Returning to FIG. 1, having applied the exclusive-or function to a set of pixels of image data, the local minimums in A' resulting from the application are located (step 20). The local minimums in A'(kx,ky) can be located by comparing each A'(kx,ky) with each of its four or eight connected neighbors. In one embodiment, a threshold requirement is applied to the local minimums to ensure that the minimum is meaningful. For the local minimums to be non-trivial (i.e., meaningful), a threshold requirement in the form of an inequality can be applied. One such inequality is given by:

$$A'(kx,ky) \geq (A'(kx,ky-1)+A'(kx,ky+1)+A'(kx-1,ky)+A'(kx+1,ky))/4+d \quad (5)$$

where d is a suitably chosen tolerance. It should be readily appreciated that the inequality of Eqn. (5) can be readily expanded to include all eight connected neighbors as well as to include non-connected neighbors. Additionally, as should be apparent to those of skill in the art, any number of other functions or inequalities can be used to test or ensure that a local minimum is non-trivial.

As indicated above, the locations of minimum values in the kx, ky plane give the horizontal and vertical projections of the period of the halftone, from which the halftone frequency and screen angle can be deduced. The minimum nearest the origin gives the fundamental period of the halftone. In one embodiment, the non-trivial local minimums of A'(kx, ky) are located by starting at the origin and testing values of A' in the order of increasing radial distance form the origin in the kx, ky plane.

Having identified the local minimum closest to the origin, the halftone frequency f and screen angle θ are determined based upon the location of the minimum (step 25). The halftone frequency f is given by inverse period:

$$f = 1/(\sqrt{kx^2 + ky^2}/R) \quad (6)$$

and the angle θ of the screen is given by:

$$\theta = \arctan(ky/kx) \quad (7)$$

Referring, again, to FIG. 3, the local minimums of A'(kx, ky) have been identified (using reference numbers 52, 54, 56, 58) and provide the projection in the x and y direction and the period of the halftone. The minimum nearest the origin, i.e., kx=4 and ky=4 (identified by reference 52), gives the fundamental period of the halftone. That is, for the present example of FIGS. 2 and 3, wherein the image resolution is R=600 spi, the halftone frequency f and screen angle θ can be computed as:

$$f = 1/(\sqrt{kx^2 + ky^2}/R) = 600/\sqrt{4^2 + 4^2} = 106 \text{ lpi}$$

$$\theta = \arctan(ky/kx) = \arctan(4/4) = 45 \text{ deg} \quad (8)$$

In other words, one may readily locate the non-trivial local minimums of A'(kx,ky) in the order of increasing radial distance form the origin in the kx, ky plane. The local closest to the origin would give the halftone frequency f and screen angle θ using EQNS. (6) and (7), respectively.

Figure 4:
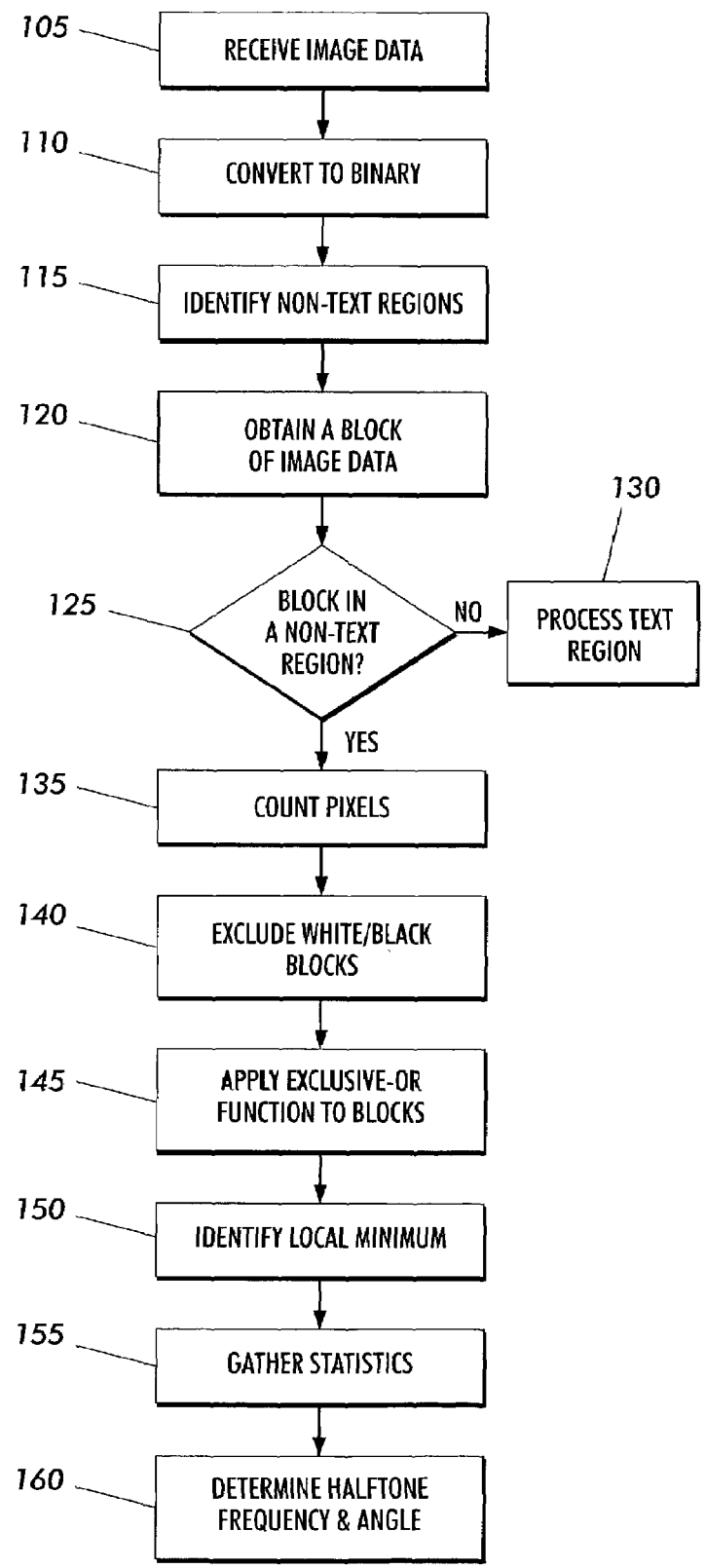
FIG. 4 illustrates an embodiment of a method of halftone estimation.

Turning now to FIG. 4, there is shown a flowchart illustrating an embodiment of a method for binary halftone frequency detection. The method operates on image data received (step 105) from an image source. For purposes describing the method of FIG. 4, the image data will be referred to as being scanned image data received from a raster input scanner or similar scanning device; however, as should be readily apparent to those of skill in the art, that image data may be received from various other image sources including, but not limited to a computer workstation, a data storage device, or a network.

If not in a binary form, the image data received is converted to a plurality of binary pixels (step 110). For example, image data from a raster scanner may be received as eight bits per pixel, wherein pixel values range from 0 (black) to 256 (white). Such pixels may be defined as being ON (or 1) if they are black (e.g., below a preselected threshold value) and OFF (or 0) if they are white (e.g., above a preselected threshold value). In such a system, the threshold may, for example, be set to a predetermined level or based on a background level determined for the document. The designation of black as ON (1) and white as OFF (0) simply reflects the fact that most documents of interest have a black foreground and a white background. However, it is to be appreciated that the present teachings are equally applicable to negative images as well.

The image data is analyzed to identify regions of the image that contain non-text image data (step 115). A segmentation operation may be applied to the binary image data to identify regions of selected image classes (image types) within the scanned image data. Briefly, a segmentation operation analyzes groups of pixels (e.g., a target pixel and its neighbors) to determine the image class for the pixels. Some common image classes include: background, edge, graphics, smooth contone, rough contone, halftones of various frequencies which may include fuzzy frequencies, text, text on halftone, text on contone, etc. The analysis and determination of image class can be based upon any of a number of well known classification functions including, but not limited to, auto-correlation, frequency analysis, pattern or template matching, peak/valley detection, histograms, etc. Additionally, determining whether the intensity of a target pixel is significantly different than the intensity of its neighboring pixels can be used to classify edge pixels. More details on segmentation and image classification can be found in numerous references including, for example, the following U.S. Pat. No. 5,327,262 to Williams; U.S. Pat. No. 5,765,029 to Schweid et al.; U.S. Pat. No. 5,778,156 to Schweid et al.; U.S. Pat. No. 5,850,474 to Fan et al.; and U.S. Pat. No. 5,852,678 to Shiau et al.

In one embodiment, the image data is segmented into text (which may include, for example, line art and background areas in addition to text) and non-text regions using a morphological segmentation process as taught by U.S. Pat. No. 5,434,953 to Bloomberg. Briefly, the process of U.S. Pat. No. 5,434,953 operates as follows. The image is first subjected to a horizontally prefiltered textured reduction operation. This operation itself is quite useful for making "thumbnail" images, because the result looks much more like text lines than would the result of a straight subsampling operation. The image is then closed (dilation followed by an erosion) with a small horizontal structuring element (SE) to consolidate the image and text parts. The image is then opened (erosion followed by a dilation) with a vertical SE which removes the text-like regions. The image is then opened with a horizontal SE to remove noise and vertical rules. Any remaining pixels are from (halftone) image regions. A bounding box computation either morphological or via connected components, identifies the location of the halftones.

Figure 5:
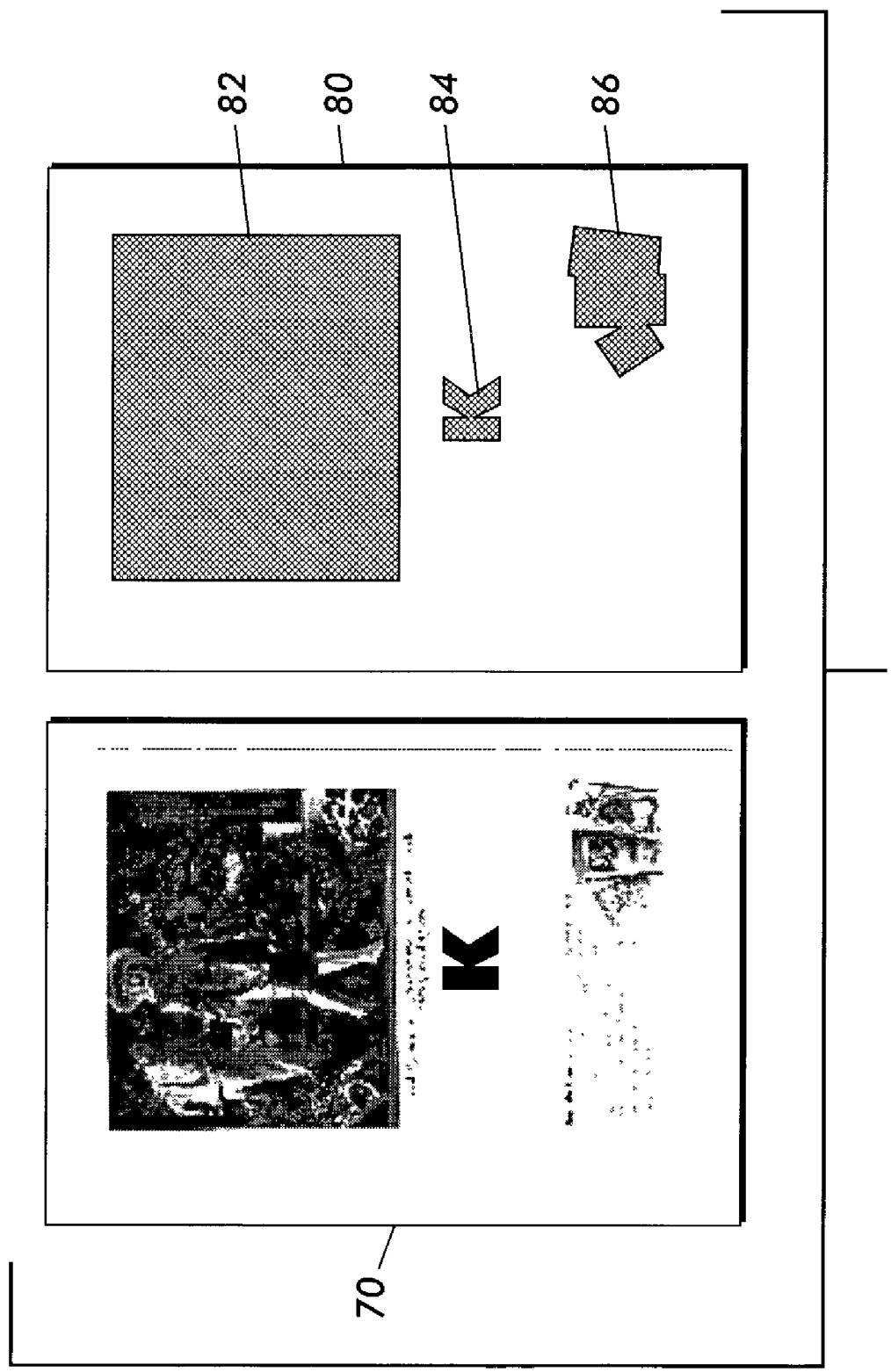
FIG. 5 illustrates a binary image and a corresponding segmentation map identifying the non-text regions of the image.

The result of such segmentation process may be considered as a segmentation map identifying text and non-text regions. Referring to FIG. 5, there is illustrated binary image 70 having both text and non-text (e.g., halftones) areas and a corresponding segmentation map 80 identifying the non-text regions 82, 84 and 86.

Returning to FIG. 4, a block of pixels within the binary image data is obtained (step 120). It should be appreciated that either the entire binary image can be divided into blocks of pixels or simply the non-text regions can be divided into blocks of pixels. Conveniently, each block of image data corresponds to a discrete section of the received video image data. Additionally, the blocks of image data conveniently comprise square or rectangular blocks of pixels. The blocks may helpfully correspond with blocks of image data classified by the segmentation operation. Although blocks of 16, 24, or 32 pixels have been shown to provide good results, it should be appreciated that blocks of any size, up to and including a whole page, may be employed. Furthermore, it is appreciated that any one or more of the size, shape, position and orientation of the blocks can be modified for a given application. Additionally, it should be appreciated that the blocks need not be mutually exclusive, i.e., the blocks may overlap. It is to be appreciated that the size, shape, position, orientation of the blocks as well as the number of blocks per non-text region may be dictated by the speed, processing resources, and accuracy requirements for a given application.

For each block of image data, a decision is made as to whether the block comprises text or non-text image data (step 125). In other words, it is determined whether the blocks coincide with the non-text regions of the document.

By way of example, the blocks of image data can be compared with segmentation map to determine if the blocks coincide with the non-text regions of the document. Alternately, blocks of data may be classified by the segmentation process.

Blocks of data that do not coincide with non-text regions are processed in accordance with image processing routines optimized those regions (step 130). For those blocks of image data that correspond to non-text regions, the number of black and white pixels within the blocks are counted (step 135). The blocks that contain either nearly all white or nearly all black pixels are excluded from halftone estimation (step 140). In one embodiment, blocks that contain over 90 percent black or over 90 percent white pixels are excluded. However, those skilled in the art will appreciate that the test for or determination of nearly black and nearly white can vary based on types of images to be received, desired accuracy, processing requirements, etc.

For qualified blocks, i.e., blocks not excluded as nearly white or black, the exclusive-or auto-correlation function A' as given by Eqn. (4) for a range of kx and ky, such as is illustrated in FIGS. 2 and 3, are computed (step 145). Having applied the exclusive-or function of Eqn. (4) to pixels within the qualified block, the kx, ky pair holding local minimum of A', if any, that is closest to the origin is identified (step 150). When identifying local minimum, the method may require that the local minimum be non-trivial.

For each non-text region within the image data, the statistics of the shifts at which the minimum of the exclusive-or occurs for the qualified blocks within the region are gathered (step 155). From the collected statistics, the halftone frequency f and screen angle θ for the region can be identified (step 160). Having identified the halftone frequency and angle, an appropriate image processing algorithm can be applied to the region.

Any number of statistics can be gathered at step 155 including, but not limited to, a count or weighted count of the shifts at which the minimum of the exclusive-or occurs or a count of the minimums closest to the origin for blocks across the region. In one embodiment, a two-dimensional histogram is employed to track kx, ky pairs holding local minimum. In other words, for each qualified block within a non-text region, the kx, ky pair containing the local minimum of A' that is closest to the origin can be accumulated to the histogram in kx and ky for the corresponding non-text region. The peak in the histogram gives the location of the shift, (the kx, ky pair local minimum closest to the origin) from which the halftone frequency and screen angle can be computed according to Eqns. (6) and (7).

Referring to FIG. 6, there is shown, by way of example, a two-dimensional histogram for the non-text region 82 of FIG. 5. As can be seen in FIG. 6, the block counts in the kx and ky histogram peaks at kx=4 and ky=4. Using kx=4 and ky=4 as the overall shift identifies the region as a 106 lpi and 45 degree halftone. Compiling statistics for a non-text region, experiments have indicated that the use of information from many blocks across the region tend to increase the reliability of the halftone estimation.

What has thus been disclosed is a method for determining halftone frequency and screen angle using an exclusive-or operation. The exclusive-or operation is applied locally to a region of binary bit map and its spatially shifted version. The resulting bits are summed over the region. The process is repeated for a range of horizontal and vertical shift values. In a halftone region, the shift at which the minimum of the sum occurs reflects the angle and the frequency of the halftone. For image data received from a scanner or other image source, a segmentation operation can be employed to identify non-text regions of the document. Each of the non-text regions created by the segmentor can be divided into small blocks and the statistics of the shifts at which the minimum of the exclusive-or occurs are gathered. From the statistics for each non-text region, the halftone angle and frequency of the region can then be deduced.

It should be appreciated that the steps described above and illustrated in the drawings need not necessarily be performed in the order described or shown in the figures. Those of skill in the art will recognize steps whose order can be reversed or which can be performed in parallel.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of processing image data to determine the frequency a binary halftone, the method comprising:
   receiving a block of pixels;
   applying a function to the block of pixels, the function being given by $$A'(kx, ky) = \sum_{x=1, y=1}^{Nx, Ny} P(x, y) \wedge P(x+kx, y+ky)$$

where P(x,y) represents a pixel intensity function at pixel position x,y in the image data, x and y define a selected pixel position, and kx and ky are selected shifts in pixel position applied to the pixel intensity function, and Nx and Ny define the pixel range over which the function is evaluated;
   identifying locations of local minimums in A'(kx,ky); and
   determining a halftone frequency f based upon locations of the local minimums.

2. The method of claim 1 further comprising determining a halftone angle θ based upon locations of the local minimums.

3. The method of claim 2 wherein the halftone angle θ is given by

θ=arctan(ky/kx).

4. The method of claim 2 wherein the halftone frequency f is given by $f=1/(\sqrt{kx^2+ky^2}/R)$ wherein R is a resolution of the image data.

5. The method of claim 1 wherein the halftone frequency f is given by $f=1/(\sqrt{kx^2+ky^2}/R)$ wherein R is a resolution of the image data.

6. The method of claim 1 wherein the step of identifying locations of local minimums identifies a local minimum closest to an origin, where kx=0, ky=0.

7. The method of claim 1 wherein the step of identifying locations of local minimums comprises comparing a local minimum to one or more neighbors to determine if the local minimum is non-trivial.

8. A method of processing image data to determine the frequency a binary halftone, the method comprising:
receiving the image data,
identifying a block of pixels within a non-text region of the image data;
applying a function to the block of pixels, the function being given by $$A'(kx, ky) = \sum_{x=1, y=1}^{Nx, Ny} P(x, y) \wedge P(x+kx, y+ky)$$

where P(x,y) represents a pixel intensity function at pixel position x,y in the image data, x and y define a selected pixel position, and kx and ky are selected shifts in pixel position applied to the pixel intensity function, and Nx and Ny define the pixel range over which the function is evaluated;
identifying locations of local minimums in A'(kx,ky);
repeating the steps of identifying a block of pixels within a non-text region, applying the function, and identifying locations of local minimums for a plurality of pixel blocks within the non-text region;
collecting statistics corresponding to the locations of local minimums identified in the plurality of pixel blocks; and
determining a halftone frequency f based upon locations of the local minimums and the collected statistics.

9. The method of claim 8 further comprising determining a halftone angle θ based upon locations of the local minimums and the collected statistics.

10. The method of claim 9 wherein the halftone angle θ is given by

θ=arctan(ky/kx).

11. The method of claim 9 wherein the halftone frequency f is given by $f=1/(\sqrt{kx^1+ky^2}/R)$ wherein R is a resolution of the image data.

12. The method of claim 8 wherein the step of identifying a block of pixels within a non-text region of the image data comprises segmenting the image data using a morphological segmentation operation.

13. The method of claim 8 wherein the step of collecting statistics comprises:
accumulating counts of the locations of local minimums in a histogram in kx and ky;
identifying a peak in the histogram; and
determining a kx, ky pair associated with the peak.

14. The method of claim 13 wherein the step of determining a halftone frequency f comprises applying the kx, ky pair associated with the peak to a function given by $f=1/(\sqrt{kx^2+ky^2}/R)$ wherein R is a resolution of the image data.

15. The method of claim 13 further comprising determining a halftone angle θ based upon locations of the local minimums and the collected statistics, wherein the halftone angle θ is given by θ=arctan(ky/kx).

16. A method of processing image data to determine the frequency a binary halftone, the method comprising:
receiving a set of pixels;
applying a function to the set of pixels, the function given by $$A'(x) = \sum_{x=1}^{N} P(x) \wedge P(x+k)$$

where P(x) represents a pixel intensity function at pixel position x in the set of data, x defines a selected pixel position, and k is a selected shift in pixel position applied to the pixel intensity function, and N defines the pixel range over which the function is evaluated;
identifying locations of local minimums in A'(x); and
determining a halftone frequency f and angle θ based upon locations of the local minimums.

17. The method of claim 16 wherein the halftone frequency f is given by $f=1/(\sqrt{kx^2+ky^2}/R)$ wherein R is a resolution of the image data.

18. The method of claim 16 wherein the halftone angle θ is given by

θ=arctan(ky/kx).

19. The method of claim 16 wherein the step of identifying locations of local minimums comprises comparing a local minimum to one or more neighbors to determine if the local minimum is non-trivial.

* * * * *